United States Patent
Osterberg, Jr. et al.

(10) Patent No.: US 7,734,696 B2
(45) Date of Patent: Jun. 8, 2010

(54) HIERARCHICAL ORG-CHART BASED EMAIL MAILING LIST MAINTENANCE

(75) Inventors: Donald H. Osterberg, Jr., Redwood City, CA (US); Daryl Geoffrey Porter, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 367 days.

(21) Appl. No.: 10/117,116

(22) Filed: Apr. 8, 2002

(65) Prior Publication Data
US 2003/0191806 A1    Oct. 9, 2003

(51) Int. Cl.
*G06F 15/16*    (2006.01)
(52) U.S. Cl. ..................................... 709/206
(58) Field of Classification Search ......... 709/217–219, 709/204–207; 707/1–10, 104
See application file for complete search history.

(56) References Cited

U.S. PATENT DOCUMENTS

| | | | | |
|---|---|---|---|---|
| 5,677,851 A * | 10/1997 | Kingdon et al. | ............. | 709/229 |
| 5,884,035 A * | 3/1999 | Butman et al. | ............. | 709/218 |
| 5,892,909 A | 4/1999 | Grasso | | |
| 5,990,886 A * | 11/1999 | Serdy et al. | ................. | 715/752 |
| 6,075,851 A * | 6/2000 | Pinard et al. | ................ | 379/199 |
| 6,115,549 A * | 9/2000 | Janis et al. | ..................... | 707/10 |
| 6,212,552 B1 * | 4/2001 | Biliris et al. | ................ | 709/206 |
| 6,366,913 B1 * | 4/2002 | Fitler et al. | ..................... | 707/9 |
| 6,385,655 B1 * | 5/2002 | Smith et al. | ................. | 709/232 |
| 6,438,608 B2 * | 8/2002 | Biliris et al. | ................ | 709/206 |
| 6,473,760 B1 | 10/2002 | Klatt et al. | | |
| 6,567,108 B1 * | 5/2003 | Master et al. | ............... | 715/853 |
| 6,581,074 B1 * | 6/2003 | Wong et al. | ................. | 707/201 |
| 6,643,687 B1 * | 11/2003 | Dickie et al. | ................ | 709/206 |
| 6,721,785 B1 * | 4/2004 | Raghunandan | ............. | 709/206 |
| 6,769,002 B2 * | 7/2004 | Ayan | ........................ | 707/104.1 |
| 6,816,589 B2 * | 11/2004 | Pinard | ................... | 379/265.01 |

(Continued)

FOREIGN PATENT DOCUMENTS

JP    63120364    5/1988

(Continued)

OTHER PUBLICATIONS

Townsend et al.; Microsoft Office 6-in-1, © 1994, Que Corporation, New Edition.*

(Continued)

*Primary Examiner*—Benjamin R Bruckart
(74) *Attorney, Agent, or Firm*—Hanify & King, P.C.

(57) ABSTRACT

The present invention is a system, method, and computer program product that provides the capability by which changes in an organization can be automatically reflected in the organization's mailing lists and access lists. The email messaging system comprises a mailing list generator operable to receive information relating to an organizational hierarchy and generate from the received information a plurality of mailing lists, at least some of the mailing lists relating to a member of the organizational hierarchy to whom at one other member of the organizational hierarchy reports and an archiver/forwarder operable to receive an email message including an address identifying at least one of the plurality of mailing lists, access the mailing list to obtain email addresses for members of the mailing list, and send the email message to the obtained email addresses.

26 Claims, 8 Drawing Sheets

U.S. PATENT DOCUMENTS

| | | | |
|---|---|---|---|
| 7,117,245 B1* | 10/2006 | Levkoff et al. | 709/206 |
| 2001/0023421 A1 | 9/2001 | Numao et al. | 707/9 |
| 2002/0078052 A1* | 6/2002 | Cheng | 707/10 |
| 2003/0061208 A1* | 3/2003 | Ohashi | 707/3 |
| 2003/0126137 A1* | 7/2003 | McFadden | 707/100 |
| 2003/0163530 A1* | 8/2003 | Ribak et al. | 709/206 |

FOREIGN PATENT DOCUMENTS

| | | |
|---|---|---|
| JP | 11-184774 | 7/1999 |
| JP | 2001-196583 | 7/2001 |
| WO | 02/103570 A1 | 12/2002 |
| WO | 03/088066 | 10/2003 |

OTHER PUBLICATIONS

Townsend et al. "Microsoft Office 6-in-1" © 1994, Que corporation.*

U.S. Appl. No. 09/893,296, filed Jun. 27, 2001, Morkel.

U.S. Appl. No. 09/870,860, filed May 30, 2001, Moaven, et al.

U.S. Appl. No. 10/167,730, filed Jun. 11, 2002, Cole et al.

"Dynamic Policy Model for Large Evolving Enterprises"; N. Dunlop et al.; Enterprise Distributed Object Computing Conference, 2001 Proceedings; Sep. 4, 2001 pp. 193-197.

Supplementary European Search Report; dated Oct. 19, 2005.

Final Decision for Rejection received in corresponding Japanese Patent Application No. 584934/2003 mailed Jul. 28, 2009.

Supplemental European Search Report dated Oct. 28, 2005 received in corresponding European application No. 03709311.9-2221.

Notification of the First Office Action dated Apr. 6, 2007 received in corresponding Chinese application 03805267.9.

Examiner's First report dated Jun. 2, 2008 received in corresponding Australian application 2003213262.

Second Examination report dated Aug. 2, 2009 received in corresponding Indian application 1290/KOLNP/2004.

First Examination report dated Sep. 2, 2009 received in corresponding Indian application 1290/KOLNP/2004.

Examiner's Requisition dated Dec. 1, 2009 received in corresponding Canadian application 2,476,108.

* cited by examiner

| 700 PEOPLE TABLE ||
|---|---|
| 702 PERSONID | 704 EMAIL ADDRESS |
| PID602 | NAME602@ORG.COM |
| PID604 | NAME604@ORG.COM |
| PID606 | NAME606@ORG.COM |
| PID608 | NAME608@ORG.COM |
| PID610 | NAME610@ORG.COM |
| PID612 | NAME612@ORG.COM |
| PID614 | NAME614@ORG.COM |
| PID616 | NAME616@ORG.COM |
| PID618 | NAME618@ORG.COM |
| PID620 | NAME620@ORG.COM |
| PID622 | NAME622@ORG.COM |

Fig. 7b

| 710 LISTS TABLE |||
|---|---|---|
| 712 LIST_ID | 714 LIST_NAME | 716 OWNER |
| LID602 | 602_ORG | PID602 |
| LID604 | 604_ORG | PID604 |
| LID606 | 606_ORG | PID606 |
| LID608 | 608_ORG | PID608 |
| LID610 | 610_ORG | PID610 |

Fig. 7c

| 720 MEMBERS TABLE | | |
|---|---|---|
| 722 LIST_ID | 724 MEMBER | 726 SUBLIST |
| LID602 | PID602 | |
| LID602 | | LID604 |
| LID602 | | LID606 |
| LID604 | PID604 | |
| LID604 | PID612 | |
| LID606 | PID606 | |
| LID606 | PID622 | |
| LID606 | | LID608 |
| LID606 | | LID610 |
| LID608 | PID608 | |
| LID608 | PID614 | |
| LID608 | PID616 | |
| LID610 | PID610 | |
| LID610 | PID618 | |
| LID610 | PID620 | |

HIERARCHICAL ORG-CHART BASED EMAIL MAILING LIST MAINTENANCE

FIELD OF THE INVENTION

The present invention relates to automatic generation of email mailing lists based on org-charts of organizational hierarchies.

BACKGROUND OF THE INVENTION

As electronic mail, or email, has become widespread, more and more organizations are relying on email for the bulk of their intra-organizational communications. As many organizations are organized hierarchically, it is useful to have the capability to send emails not only to individuals in the organizations, but to groups of individuals who make up sub-organizations within the hierarchy. This function may be performed by the use of mailing lists that include the appropriate individuals. Likewise, access to such information may be controlled by the use of access lists. However, information relating to the structure of the hierarchy, including the sub-organizations of the hierarchy and the included individuals, is typically kept in an organizational chart, or org-chart, which is separate from the mailing lists or access lists. When changes are made to the organization, whether changes in the individuals or changes in the structure of the hierarchy, these changes must be made to the org-chart and must also be reflected in the mailing lists and access lists. Currently, this requires manual updates to be made to the mailing lists and access lists. This manual updating is labor-intensive, time consuming, and expensive. A need arises for a technique by which changes in an organization can be automatically reflected in the organization's mailing lists and access lists.

SUMMARY OF THE INVENTION

The present invention is a system, method, and computer program product that provides the capability by which changes in an organization can be automatically reflected in the organization's mailing lists and access lists.

In one embodiment, the present invention is a method of email messaging using mailing lists comprising the steps of: receiving information relating to an organizational hierarchy, extracting from the received information at least identifiers of members of the organizational hierarchy, information relating to positions of the members in the organizational hierarchy, and information relating to email addresses of the members, and generating a plurality of mailing lists based on the extracted information.

In one aspect of the present invention, at least one of the plurality of mailing lists comprises: an identifier of the mailing list corresponding to a first member of the organizational hierarchy and a plurality of identifiers of members of the organizational hierarchy who report to the first member. The plurality of identifiers of members of the organizational hierarchy who report to the first member may comprise at least one identifier of a second member of the organizational hierarchy to whom at least one other member of the organizational hierarchy reports. The at least one identifier of the second member of the organizational hierarchy may include an indicator that at least one other member of the organizational hierarchy reports to the second member.

In one aspect of the present invention, the method further comprises the steps of: receiving an email message including an identifier of one of the plurality of mailing lists, accessing the identified mailing list to obtain at least one email address of at least one member of the mailing list, and sending the email message to the obtained at least one email address.

In one aspect of the present invention, the method further comprises the steps of: generating at least one access list defining permissions for at least some of the plurality of mailing lists. The method may further comprise the steps of: receiving an email message including an identifier of one of the plurality of mailing lists, determining that a sender of the email message has permission to send email messages to the identified mailing list using an access list, accessing the identified mailing list to obtain at least one email address of at least one member of the mailing list, and sending the email message to the obtained at least one email address. The method may further comprise the step of: generating a plurality of aliases, each alias identifying one of the plurality of mailing lists. The method may further comprise the steps of: receiving an email message including an alias identifying one of the plurality of mailing lists, determining that a sender of the email message has permission to send email messages to the identified mailing list, accessing the identified mailing list to obtain at least one email address of at least one member of the mailing list, and sending the email message to the obtained at least one email address.

In one embodiment, the present invention is an email messaging system comprising a mailing list generator operable to receive information relating to an organizational hierarchy and generate from the received information a plurality of mailing lists, at least some of the mailing lists relating to a member of the organizational hierarchy to whom at least one other member of the organizational hierarchy reports and an archiver/forwarder operable to receive an email message including an address identifying at least one of the plurality of mailing lists, access the mailing list to obtain email addresses for members of the mailing list, and send the email message to the obtained email addresses.

In one aspect of the present invention, the information relating to the organizational hierarchy comprises identifiers of members of the organizational hierarchy, information relating to positions of the members in the organizational hierarchy, and information relating to email addresses of the members. At least one of the plurality of mailing lists may comprise an identifier of the mailing list corresponding to a first member of the organizational hierarchy and a plurality of identifiers of members of the organizational hierarchy who report to the first member. The plurality of identifiers of members of the organizational hierarchy who report to the first member may comprise at least one identifier of a second member of the organizational hierarchy to whom at least one other member of the organizational hierarchy reports. The at least one identifier of the second member of the organizational hierarchy may include an indicator that at least one other member of the organizational hierarchy reports to the second member.

In one aspect of the present invention, the mailing list generator is further operable to generate at least one access list defining permissions for at least some of the plurality of mailing lists. The archiver/forwarder may be further operable to determine that a sender of the email message has permission to send email messages to the identified mailing list using an access list The mailing list generator may be further operable to generate a plurality of aliases, each alias identifying one of the plurality of mailing lists. The archiver/forwarder may be further operable to receive an email message including an alias identifying one of the plurality of mailing lists, determine that a sender of the email message has permission to send email messages to the identified mailing list, and access the identified mailing list to obtain at least one email address of at least one member of the mailing list.

In one aspect of the present invention, at least one of the plurality of mailing lists comprises an identifier of the mailing list corresponding to a first member of the organizational hierarchy and at least one identifier of a member of the organizational hierarchy who reports to the first member.

BRIEF DESCRIPTION OF THE DRAWINGS

The details of exemplary embodiments of the present invention, both as to its structure and operation, can best be understood by referring to the accompanying drawings, in which like reference numbers and designations refer to like elements.

Figure 3:
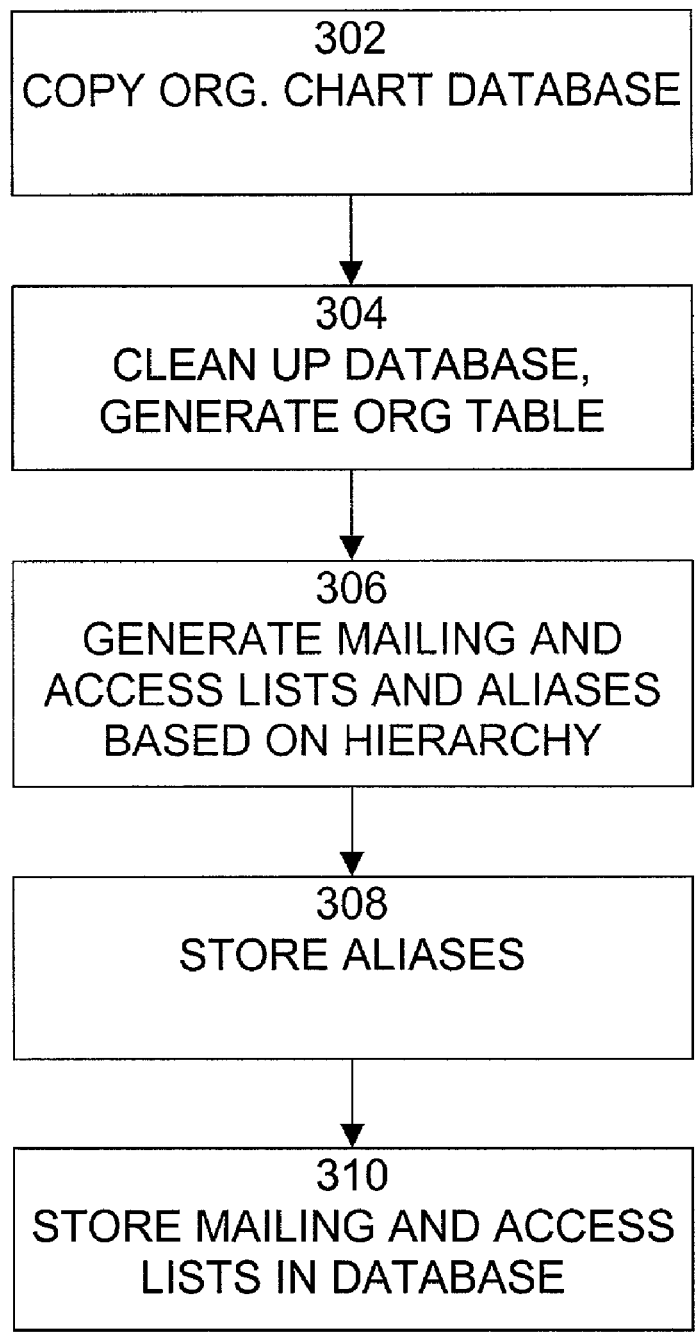
FIG. 3 is a flow diagram of an exemplary embodiment of a list generation process that may be performed by the list generation system shown in FIG. 2.
Figure 6:
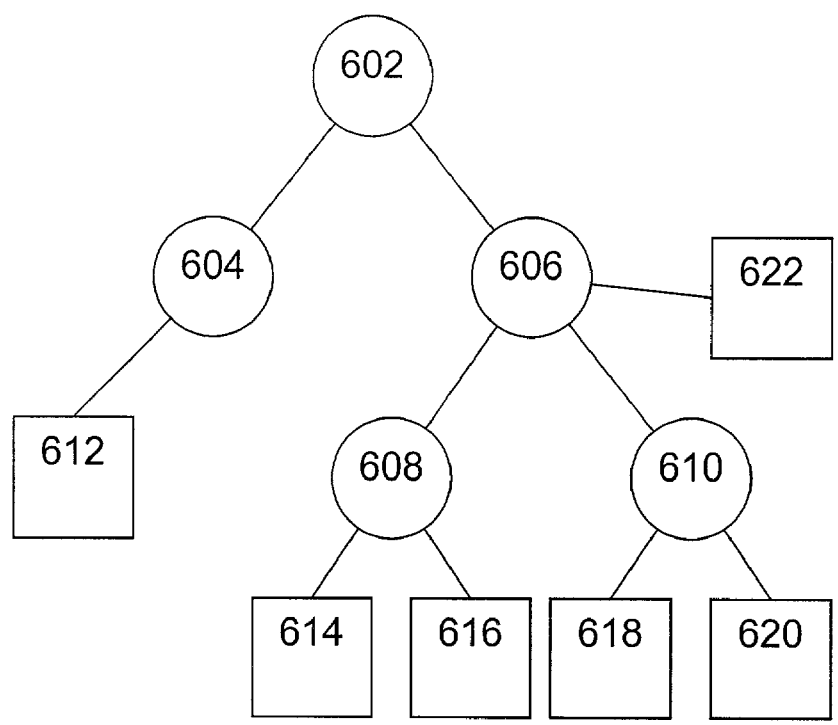
FIG. 6 is an exemplary org-chart showing an organizational hierarchy of a type that may be processed by the present invention.

An exemplary people table generated from an org-chart shown in FIG. 6 by the process shown in FIG. 3 is shown in FIG. 7a.

An exemplary lists table is shown in FIG. 7b.

An exemplary members table is shown in FIG. 7c.

DETAILED DESCRIPTION OF THE PREFERRED EMBODIMENT

Figure 1:
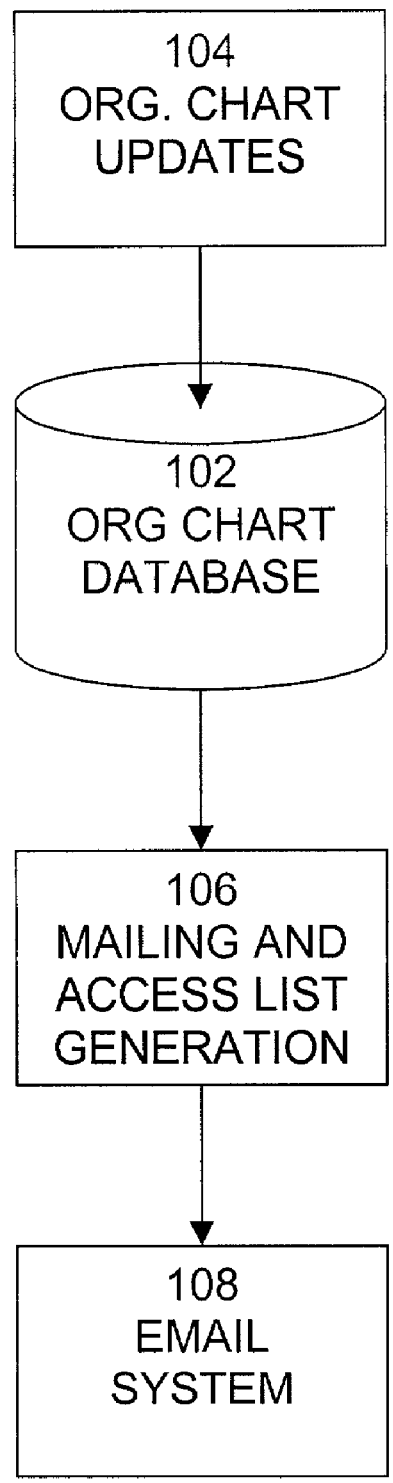
FIG. 1 is a block diagram showing an overview of an exemplary embodiment of automated generation of mailing and access lists from hierarchical org-charts.

An overview of an exemplary embodiment of automated generation of mailing and access lists from hierarchical org-charts is shown in FIG. 1. In the example shown in FIG. 1, org-charts are stored in an org-chart database 102. The org-charts may be stored in any suitable format, but typically include information such as the names of individual employees, the names of managers of employees, the names of sub-organizations, departments, groups, etc., to which employees belong, email addresses, telephone numbers, and office locations of employees, etc. Org-chart database may be stored in any type of database, such as a flat database, a hierarchical database, or a relational database, etc.

Updates 104 may be made to the information stored in org-chart database 102. Typically, updates 104 are performed manually, on an as needed basis, but the present invention contemplates any method or means for performing updates 104 to org-chart database 102. For example, updates 104 may be performed automatically, or periodically, etc.

The necessary information is extracted from org-chart database 102 and mailing and access lists are generated 106 from the extracted information. The mailing and access lists are stored in a form that allows their use by email system 108.

Figure 2:
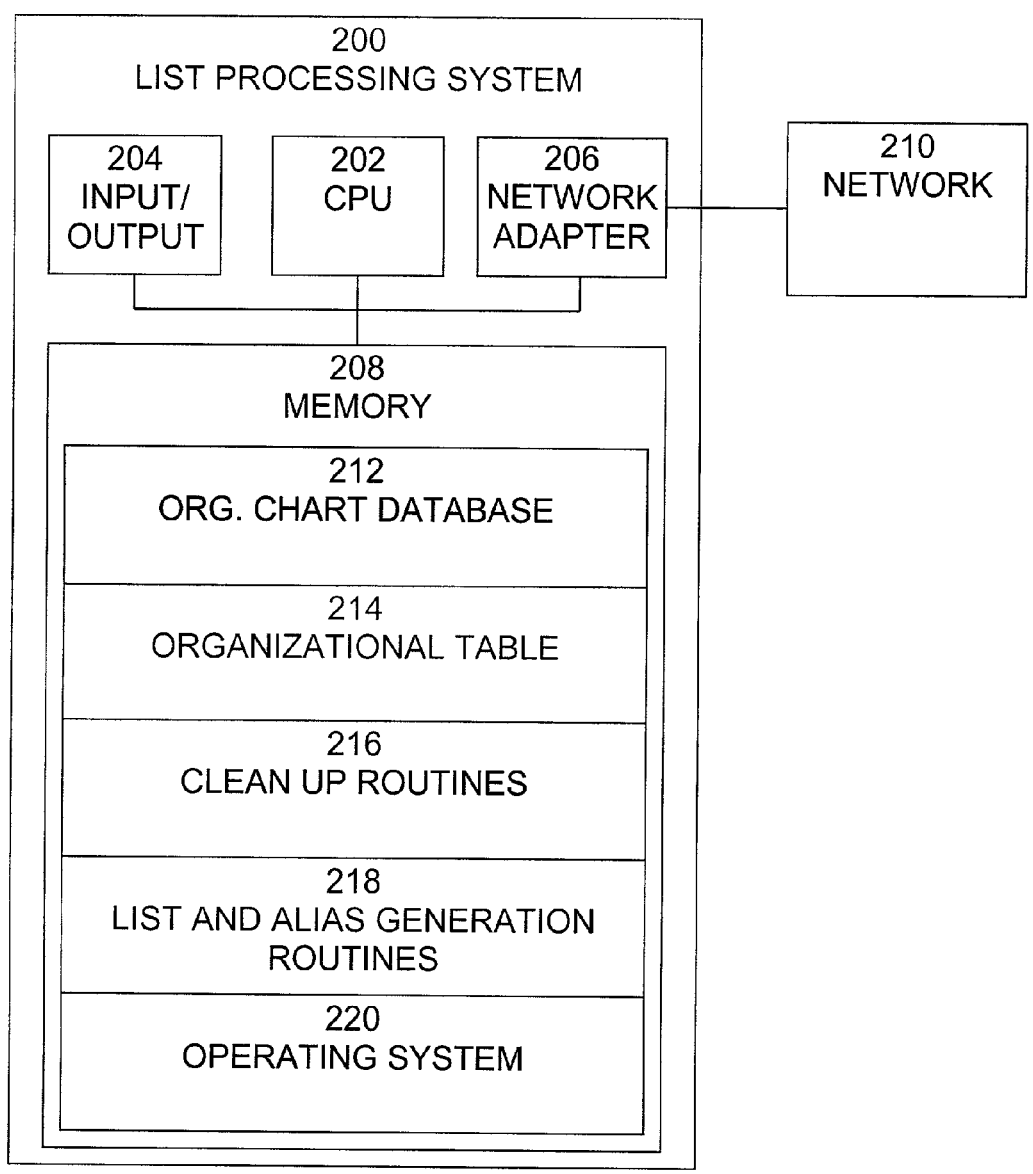
FIG. 2 is a block diagram of an exemplary list processing system, which may be used to implement an embodiment of the present invention.

A block diagram of an exemplary list processing system 200, which may be used to implement an embodiment of the present invention, is shown in FIG. 2. List processing system 200 is typically a programmed general-purpose computer system, such as a personal computer, workstation, server system, and minicomputer or mainframe computer. List processing system 200 includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Input/output circuitry 204 provides the capability to input data to, or output data from, computer system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces list processing system 200 with network 210. Network 210 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes a plurality of blocks of data, such as received org-chart database 212 and organizational table 214, and a plurality of blocks of program instructions, such as clean up routines 216, processing routines 218 and operating system 220. Org-chart database 212 includes information relating to an organizational hierarchy made up of groups and sub-groups of members of the hierarchy. Org-chart database 212 includes information such as the names of individual employees, the names of managers of employees, the names of sub-organizations, departments, groups, etc., to which employees belong, email addresses, telephone numbers, and office locations of employees, etc. Org-chart database 212 may be stored in any type of database, such as a flat database, a hierarchical database, or a relational database, etc. Although in the example shown in FIG. 2, org-chart database 212 is included in list processing system 200, org-chart database 212 may instead be stored in a separate database system, from which the necessary information, up to and including the entire org-chart database, may be extracted or copied.

Organizational table 214 includes information extracted from org-chart database 212, which is necessary for use in generating the mailing and access lists. Clean up routines 216 process the information contained in org-chart database 212 in order to generate organizational table 214. List and alias generation routines 218 process organizational table 216 in order to generate the mailing and access lists and the associated aliases. Operating system 220 provides overall system functionality.

A flow diagram of an exemplary embodiment of a list generation process 300 that may be performed by list generation system 200, shown in FIG. 2, is shown in FIG. 3. FIG. 3 is best viewed in conjunction with FIG. 5, which is a data flow diagram including the exemplary embodiment of the list generation process shown in FIG. 3. Process 300 begins with optional step 302, in which mailing list system 502 makes a copy 504 of org-chart database 506. In those embodiments in which org-chart database 506 is remotely located, accessible through a relatively slow connection, very large, etc., so that the processing time and access overhead of directly processing org-chart database 506 would be large, it may be preferable to make a copy 504 of org-chart database 506 to use for processing. In other embodiments, in which org-chart database 506 is stored in mailing list system 502, accessible through a fast connection, small, etc., so that processing time and access overhead of directly processing org-chart database 506 are not large, it may be preferable to directly process org-chart database 506, rather than make copy 504.

In step 304, org-chart database 506 or copy 504 of the org-chart database is processed by org-chart database clean up process 508, which removes unnecessary information. The necessary information in org-chart database 506 or copy 504 of the org-chart database is extracted and processed to form organizational table 510. In particular, information identifying each individual, information relating to the position in the organizational hierarchy of each identified individual, and information identifying an email address of each identified individual is extracted and processed. Organizational table 510 includes the extracted information in a form that is conveniently usable to generated mailing and access lists.

In step 306, mailing and access lists and aliases are generated by list/alias generation process 512. A mailing list includes identifiers of individuals included in the list, along with identifiers of subgroups that are included in the list. Only individuals are end nodes in the hierarchy; any subgroup may include individuals and subgroups. Subgroups are defined based on the hierarchical reporting structure of the organization. A manager is defined as any individual who has someone reporting to them. Direct reports are defined as individuals who report directly to a manager. A manager may have as direct reports either individuals who are managers, individuals who are not managers, or both. A mailing list for a manager's organization would include identifiers of that managers direct reports, along with identifiers of subgroups that include the organizations of any managers who are direct reports.

An access list includes information specifying the access permissions for the mailing lists. For example, access permissions may allow members of a mailing list to send email to members of that list, to members of the organizations of any managers who are members of the list, to members of organizations of managers at specified lower levels, etc. Access permissions are preferably configurable.

Figure 5:
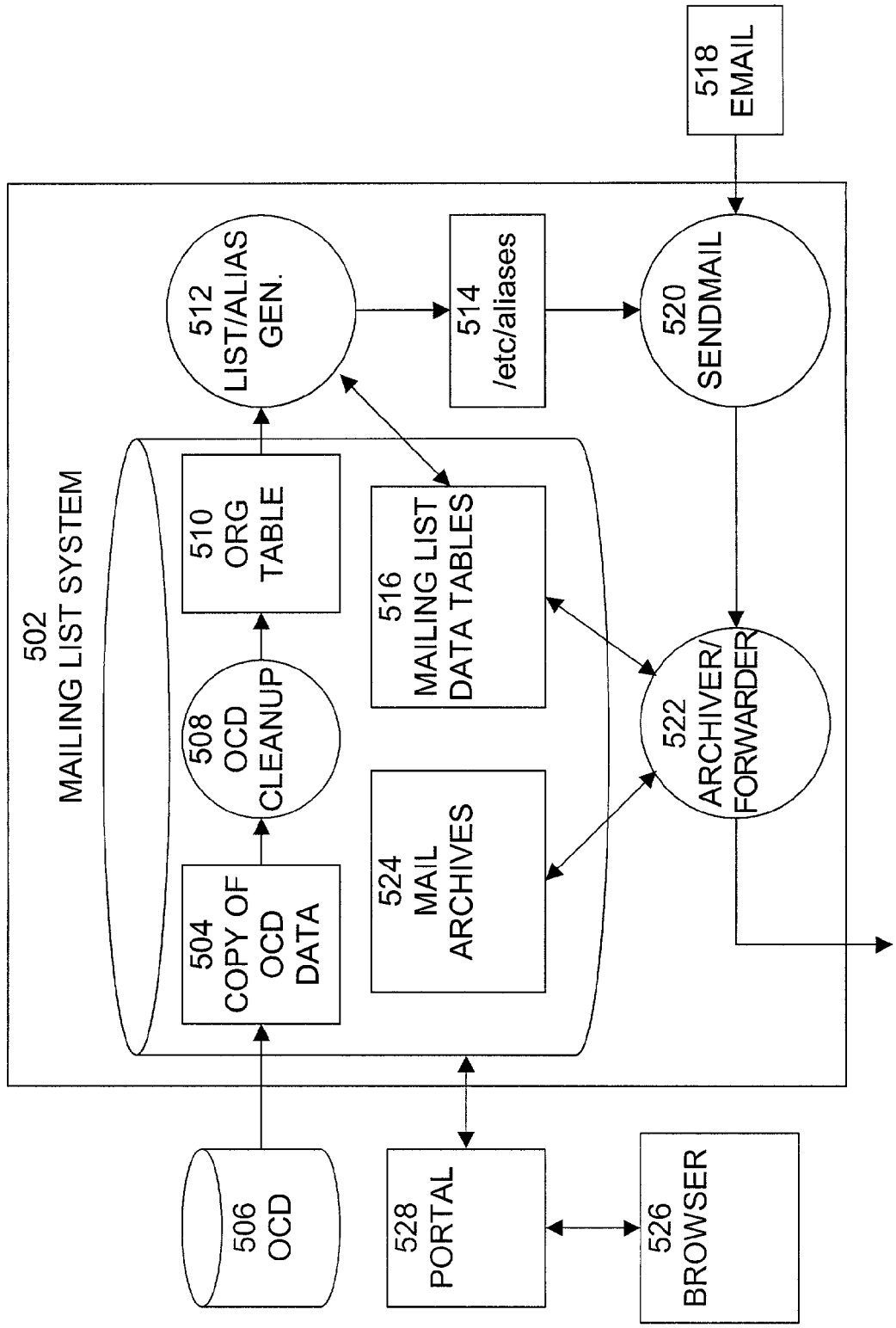
FIG. 5 is a data flow diagram including the exemplary embodiment of the list generation process shown in FIG. 4.

Aliases are generated in order to implement the described functionality into existing email systems. For example, many popular email systems utilize the UNIX® operating system, and FIG. 5 exemplifies an implementation that uses that operating system. As shown in FIG. 5, a file 514, identified as "/etc/aliases", is defined to store aliases that may be used by the email system. An alias is an alternative name, or pointer, to an object. Appropriate aliases are generated in step 306 for use by the email system and, in step 308, these aliases are stored in the appropriate subdirectory. It is important to recognize that aliases are used only because certain email systems require their use in order to integrate the described functionality. The present invention contemplates email systems that do not require aliases for such functional integration, as well as those that do.

In step 310, the mailing and access lists generated in step 306 are stored in mailing list data tables 516. Mailing list data tables 516 include the information in the generated mailing and access lists arranged in a format that facilitates access to particular portions of that information.

Figure 4:
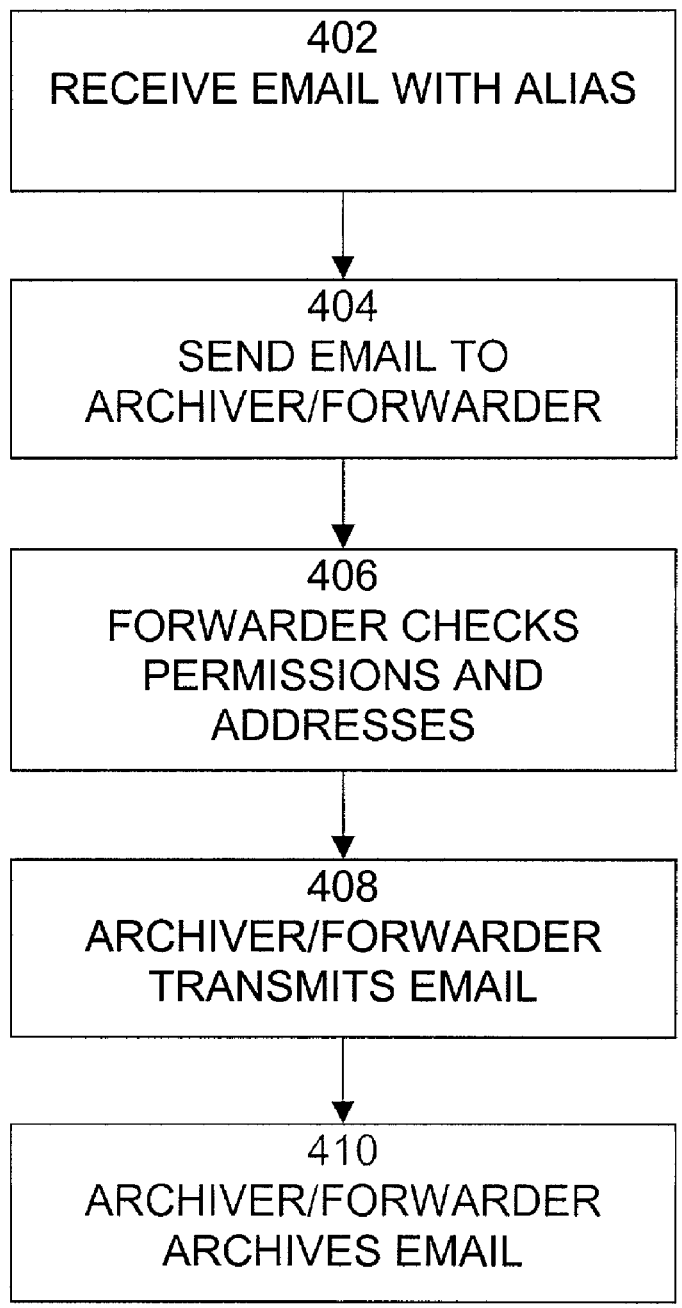
FIG. 4 is a flow diagram of an exemplary embodiment of an email transmission process.

A flow diagram of an exemplary embodiment of an email transmission process 400 is shown in FIG. 4. FIG. 4 is best viewed in conjunction with FIG. 5, which is a data flow diagram including the exemplary embodiment of the list generation process shown in FIG. 4. The process begins with step 402, in which an email message 518 addressed to one or more members of a mailing list maintained by mailing list system 502, is received at mailing list system 502. Typically, email message 518 is addressed to one or more members of a mailing list by including in an address field of the email message 518 one or more alias addresses that identify the desired recipients of the message. Email message 518 is received by a sendmail process 520, or an equivalent process, which is a standard component of an email system for handling the transmission of email messages. In a typical exemplary implementation, such as an implementation that uses the UNIX® operating system, sendmail process 520 accesses file 514 and obtains identifiers or destinations to which the aliases that the email messages address refer.

In order to implement automatically generated mailing and access lists, the alias addresses included in file "/etc/aliases" 514 all point to archiver/forwarder 522. Thus, in step 404, email message 518 is sent to archiver forwarder 522. For each alias address included in email message 518, sendmail process 520 accesses file 514, locates the alias address, obtains an identifier or destination to which the alias refers, which is archiver/forwarder 522, and sends email message 518 to archiver/forwarder 522. In step 406, archiver/forwarder 522 receives email message 518 and checks the permissions and addresses included in the message. For each address included in email message 518, archiver/forwarder 522 accesses mailing list data tables 516 and accesses the identifiers and access permissions associated with the address. In particular, archiver/forwarder 520 determines whether the sender of the message has permission to send messages to the address included in the message. For example, access permissions may allow members of a mailing list to send email to members of that list, to members of the organizations of any managers who are members of the list, to members of organizations of managers at specified lower levels, etc. If the sender does have permission to send messages to the address included in the message, archiver/forwarder 522 then generates the actual email addresses that correspond to the address included in the message. If the address included in the message is an individual email address, that individual email address is generated. If the address included in the message specifies an organization, the mailing list for that organization is accessed to obtain the included addresses. The included individual addresses are generated and the included sub-organizations are accessed to obtain the included addresses. This process is continued recursively until only individual addresses remain, or until permissions regarding access to lower levels, or specifications of lower levels to be accessed, are exceeded.

Once all email addresses are generated, in step 408, archiver/forwarder 522 transmits the email message including the generated email addresses. In step 410, archiver/forwarder 522 archives the transmitted email message in email archives 524. Depending upon the implementation, email archives 524 may include the actual transmitted email messages, along with information to facilitate accessing the email messages, or email archives 524 may only include information to facilitate accessing the email messages, which may be stored elsewhere.

An additional feature of mailing list system 502 is the capability for users of the system to view the mailing lists and email archives. A user of the system may typically view the mailing lists and email archives using a browser program 526 running on a computer system or other device. Browser 526, the computer system, and any associated network hardware and software (not shown), provide a connection to portal 528, which provides access to mailing list system 502. Portal 528 typically authenticates users desiring access, for example, by allowing such users to login. Once a user gains access, the user may view mailing lists to which the user belongs and view archived email messages. In addition, users having the proper access permission may configure or modify the permissions of other users, and, in some cases, modify the mailing lists themselves. The capability to directly modify mailing lists may be useful in situations in which there is significant latency between changes in an organization and updating of the org-chart database.

The capability to directly modify mailing lists may also be useful in situations in which there is significant latency between changes to the org-chart database and updating of the mailing list data tables. However, preferably the process shown in FIG. 3 will be performed on a periodic basis with a short enough period to reduce this latency to the point that direct modification of mailing lists is unnecessary.

An exemplary org-chart 600 is shown in FIG. 6. Org-chart 600 includes a plurality of members, including a plurality of managers, such as members 602, 604, 606, 608, and 610, and a plurality of individuals, such as members 612, 614, 616, 618, 620, and 622. For example, member 602 is a manager. Members 604 and 606 are managers who report to member 602. Member 612 is an individual who reports to member 604. Members 608 and 610 are managers who report to member 606, while member 622 is an individual who reports to member 606. Members 614 and 616 are individuals who report to member 608 and members 618 and 620 are individuals who report to member 610.

Examples of tables used by the process shown in FIG. 3 are shown in FIGS. 7a, 7b, and 7c. An example of a people table 700 generated from org-chart 600 by the process shown in FIG. 3 is shown in FIG. 7a. People table 700 associates individuals with email addresses. For example, people table 700 includes a plurality of columns, such as personID column 702 and email address column 704. PersonID column 702 includes a plurality of personIDs, which identify individuals, while email address column 704 contains email addresses corresponding to each personID. The actual values of the personID is generated automatically, and are not necessarily based on the name of the person that they identify.

An example of a lists table 710 is shown in FIG. 7b. Lists table 710 associates individuals who own mailing lists with the mailing lists that they own. For example, lists table 710 includes a plurality of columns, such as list_ID column 712, list_Name column 714, and owner column 716. List_ID column 712 includes a plurality of list_IDs, which identify mailing lists. List_Name column 714 includes a plurality of list_Names, which are names that are used to specify a mailing list. Owner column 716 includes a plurality of personIDs, which identify the individual or individuals who own each mailing list.

An example of a members table 720 is shown in FIG. 7c. Members table 720 associates mailing lists with the members of those mailing lists. For example, members table 720 includes a plurality of columns, such as list_ID column 722, member column 724, and sublist column 726. List_ID column 712 includes a plurality of list_IDs, which identify mailing lists. Member column 724 includes a plurality of person-IDs, each of which identifies an individual who is a member of the associated mailing list. Sublist column 724 includes a plurality of list_IDs, each of which identifies a sublist that is included in the associated mailing list. Sublist column 724 allows members table 720 to provide hierarchical nesting of sub mailing lists under the parent mailing lists. In addition, all list owners are members of the mailing lists that they own.

For example, expanding a list, such as the list identified as 606_org in FIG. 7b, would involve:
Look up list_name 606_org in the LISTS TABLE
This yields a list_id of LID606
Expand list_id LID606 into a list of members
   First get and expand the individual (leaf node) members
This yields PID606 and PID622
   Get the email address for each member from the PEOPLE TABLE
This yields NAME606@ORG.COM and NAME622@ORG.COM
   Then get and expand sublists
This yields LID608 and LID610
   Recursively expand each of these sublists
This process is simply one example of a list expansion process. This implementation assumes a relational database as the data store. Other types of data stores would use different expansion processes. Any and all such processes based on any and all implementations are within the scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of email messaging using mailing lists comprising the steps of:
   receiving from an org-chart database an org-chart defining an organizational hierarchy relating to an organization, including information defining a structure of the hierarchy and information defining sub-organizations and individuals within the organization;
   extracting from the received information at least identifiers of members of the organizational hierarchy, information defining individual and sub-organization reporting relationships of the members in the organizational hierarchy, and information relating to email addresses of the members;
   automatically generating a plurality of mailing lists based on the extracted information;
   storing the plurality of automatically generated mailing lists by storing a plurality of tables in a database system;
   directly modifying one or more of the plurality of automatically generated mailing lists as stored in the plurality of tables;

generating at least one access list defining permissions for at least some of the plurality of mailing lists;

receiving an email message including an identifier of one of the plurality of mailing lists;

determining that a sender of the email message has permission to send email messages to the identified mailing list using an access list;

accessing the identified mailing list to obtain at least one email address of at least one member of the mailing list; and sending the email message to the obtained at least one email address.

2. The method of claim 1, wherein at least one of the plurality of mailing lists comprises:

an identifier of the mailing list corresponding to a first member of the organizational hierarchy; and a plurality of identifiers of members of the organizational hierarchy who report to the first member.

3. The method of claim 2, wherein the plurality of identifiers of members of the organizational hierarchy who report to the first member comprises at least one identifier of a second member of the organizational hierarchy to whom at least one other member of the organizational hierarchy reports.

4. The method of claim 3, wherein the at least one identifier of the second member of the organizational hierarchy includes an indicator that at least one other member of the organizational hierarchy reports to the second member.

5. The method of claim 1, further comprising the step of:

generating a plurality of aliases, each alias identifying one of the plurality of mailing lists.

6. The method of claim 5, further comprising the steps of:

receiving an email message including an alias identifying one of the plurality of mailing lists;

determining that a sender of the email message has permission to send email messages to the identified mailing list;

accessing the identified mailing list to obtain at least one email address of at least one member of the mailing list; and sending the email message to the obtained at least one email address.

7. The method of claim 1, wherein the plurality of tables in the database system include:

a first table associating identifiers of members of the automatically generated mailing lists with email addresses;

a second table associating a plurality of owners of the automatically generated mailing lists with the automatically generated mailing lists owned by each one of the plurality of owners, including a name of each automatically generated mailing list and an additional identifier of each automatically generated mailing list; and a third table associating each automatically generated mailing list with identifiers of members of each automatically generated mailing list.

8. A computer-implemented email messaging system comprising:

a mailing list generator operable to receive from an org-chart database an org- chart defining a structure of an organization and information defining sub-organizations and individuals within the organization and individual and sub-organization reporting relationships in an organizational hierarchy of the organization and automatically generate from the received information a plurality of mailing lists, at least some of the automatically generated mailing lists relating to a member of the organizational hierarchy to whom at least one other member of the organizational hierarchy reports;

a database storing the plurality of automatically generated mailing lists, the database including the capability to directly modifying one or more of the plurality of automatically generated mailing lists as stored in the database; and and an archiver/forwarder operable to receive an email message including a name identifying at least one of the plurality of automatically generated mailing lists, forward the received email message to email addresses of members of the automatically generated mailing list, and archive the sent email message, wherein the mailing list generator is further operable to generate at least one access list defining permissions for at least some of the plurality of mailing lists and to generate a plurality of aliases, each alias identifying one of the plurality of mailing lists and the archiver/forwarder is further operable to receive an email message including an alias identifying one of the plurality of mailing lists, determine that a sender of the email message has permission to send email messages to the identified mailing list, and access the identified mailing list to obtain at least one email address of at least one member of the mailing list.

9. The system of claim 8, wherein the information relating to the organizational hierarchy comprises identifiers of members of the organizational hierarchy, information relating to positions of the members in the organizational hierarchy, and information relating to email addresses of the members.

10. The system of claim 9, wherein at least one of the plurality of mailing lists comprises:

an identifier of the mailing list corresponding to a first member of the organizational hierarchy; and a plurality of identifiers of members of the organizational hierarchy who report to the first member.

11. The system of claim 10, wherein the plurality of identifiers of members of the organizational hierarchy who report to the first member comprises at least one identifier of a second member of the organizational hierarchy to whom at least one other member of the organizational hierarchy reports.

12. The system of claim 11, wherein the at least one identifier of the second member of the organizational hierarchy includes an indicator that at least one other member of the organizational hierarchy reports to the second member.

13. The system of claim 8, wherein the archiver/forwarder is further operable to determine that a sender of the email message has permission to send email messages to the identified mailing list using an access list.

14. The system of claim 8, wherein at least one of the plurality of mailing lists comprises:

an identifier of the mailing list corresponding to a first member of the organizational hierarchy; and at least one identifier of a member of the organizational hierarchy who reports to the first member.

15. The computer-implemented email messaging system of claim 8, wherein the database comprises a first table associating identifiers of members with email addresses, a second table associating a plurality of owners of the automatically generated mailing lists with the automatically generated mailing lists owned by each one of the plurality of owners, including a name of each mailing list and an identifier of each mailing list, and a third table associating each automatically generated mailing list with identifiers of members of each automatically generated mailing list; and the archiver/forwarder is further operable to access the second table in the database using the received name of an automatically generated mailing list to obtain an identifier of the mailing list, accessing the first table in the database using the obtained identifier of the automatically generated mailing list to obtain identifiers of members of the automatically generated mailing list; access the third table with the database system using the identifiers of the members of the automatically generated mailing list to obtain email addresses for members of the automatically generated mailing list, send the email message to the obtained email addresses.

16. A computer program product for performing email messaging using mailing lists, comprising
a computer recordable non-transmissive medium;
computer program instructions, recorded on the computer readable medium, executable by a processor, for performing the steps of
receiving from an org-chart database an org-chart defining an organizational hierarchy relating to an organization, including information defining a structure of the hierarchy and information defining sub-organizations and individuals within the organization;
extracting from the received information at least identifiers of members of the organizational hierarchy, information defining individual and sub-organization reporting relationships of the members in the organizational hierarchy, and information relating to email addresses of the members;
automatically generating a plurality of mailing lists based on the extracted information; and
storing the plurality of automatically generated mailing lists by storing a plurality of tables in a database system;
directly modifying one or more of the plurality of automatically generated mailing lists as stored in the plurality of tables;
generating at least one access list defining permissions for at least some of the plurality of mailing lists;
receiving an email message including an identifier of one of the plurality of mailing lists;
determining that a sender of the email message has permission to send email messages to the identified mailing list using an access list;
accessing the identified mailing list to obtain at least one email address of at least one member of the mailing list; and
sending the email message to the obtained at least one email address.

17. The computer program product of claim 16, wherein at least one of the plurality of mailing lists comprises:
an identifier of the mailing list corresponding to a first member of the organizational hierarchy; and
a plurality of identifiers of members of the organizational hierarchy who report to the first member.

18. The computer program product of claim 17, wherein the plurality of identifiers of members of the organizational hierarchy who report to the first member comprises at least one identifier of a second member of the organizational hierarchy to whom at least one other member of the organizational hierarchy reports.

19. The computer program product of claim 18, wherein the at least one identifier of the second member of the organizational hierarchy includes an indicator that at least one other member of the organizational hierarchy reports to the second member.

20. The computer program product of claim 16, further comprising the step of:
generating a plurality if aliases, each identifying one of the plurality of mailing lists.

21. The computer program product of claim 20, further comprising the steps of:
receiving an email message including an alias identifying one of the plurality of mailing lists;
determining that a sender of the email message has permission to send email messages to the identified mailing list;
accessing the identified mailing list to obtain at least one email address of at least one member of the mailing list; and
sending the email message to the obtained at least one email address.

22. The computer program product of claim 16, wherein the plurality of tables in the database system include:
a first table associating identifiers of members of the automatically generated mailing lists with email addresses;
a second table associating a plurality of owners of the automatically generated mailing lists with the automatically generated mailing lists owned by each one of the plurality of owners, including a name of each automatically generated mailing list and an additional identifier of each automatically generated mailing list; and
a third table associating each automatically generated mailing list with identifiers of members of each automatically generated mailing list.

23. The computer program product of claim 22, further comprising the steps of:
receiving an email message including name of one of the plurality of mailing lists; accessing the second table with the database system using the received name of a mailing list to obtain an identifier of the mailing list;
accessing the first table with the database system using the obtained identifier of the mailing list to obtain at least one identifier of a member of the mailing list;
accessing the third table with the database system using the identifier of the member of the mailing list to obtain at least one email address of the member of the mailing list; and sending the email message to the obtained at least one email address.

24. A computer-implemented method of email messaging using mailing lists comprising the steps of:
receiving from an org-chart database an org-chart defining an organizational hierarchy relating to an organization, including information defining a structure of the hierarchy and information defining sub-organizations and individuals within the organization;
extracting from the received information at least identifiers of members of the organizational hierarchy, information defining individual and sub-organization reporting relationships of the members in the organizational hierarchy, and information relating to email addresses of the members;
automatically generating a plurality of mailing lists based on the extracted information;
storing the plurality of automatically generated mailing lists by storing a plurality of tables in a database system, the tables including:
a first table associating identifiers of members of the automatically generated mailing lists with email addresses;
a second table associating a plurality of owners of the automatically generated mailing lists with the automatically generated mailing lists owned by each one of the plurality of owners, including a name of each automatically generated mailing list and an additional identifier of each automatically generated mailing list; and
a third table associating each automatically generated mailing list with identifiers of members of each automatically generated mailing list; and generating a plurality of aliases, each alias identifying one of the plurality of mailing lists;

receiving an email message including an alias identifying one of the plurality of mailing lists;

determining that a sender of the email message has permission to send email messages to the identified mailing list;

accessing the identified mailing list to obtain at least one email address of at least one member of the mailing list; and sending the email message to the obtained at least one email address.

25. The method of claim 24, further comprising the steps of:

receiving an email message including name of one of the plurality of mailing lists;

accessing the second table with the database system using the received name of a mailing list to obtain an identifier of the mailing list;

accessing the first table with the database system using the obtained identifier of the mailing list to obtain at least one identifier of a member of the mailing list;

accessing the third table with the database system using the identifier of the member of the mailing list to obtain at least one email address of the member of the mailing list; and sending the email message to the obtained at least one email address.

26. A computer program product for performing email messaging using mailing lists, comprising:

a computer recordable non-transmissive medium;

computer program instructions, recorded on the computer readable medium, executable by a processor, for performing the steps of receiving from an org-chart database an org-chart defining an organizational hierarchy relating to an organization, including information defining a structure of the hierarchy and information defining sub-organizations and individuals within the organization;

extracting from the received information at least identifiers of members of the organizational hierarchy, information defining individual and sub-organization reporting relationships of the members in the organizational hierarchy, and information relating to email addresses of the members;

automatically generating a plurality of mailing lists based on the extracted information; and storing the plurality of automatically generated mailing lists by storing a plurality of tables in a database system, the tables including:

a first table associating identifiers of members of the automatically generated mailing lists with email addresses;

a second table associating a plurality of owners of the automatically generated mailing lists with the automatically mailing lists owned by each one of the plurality of owners including a name of each automatically generated mailing list and an identifier of each mailing list; and a third table associating each automatically generated mailing list with identifiers of members of each generated mailing list;

generating at least one access list defining permissions for at least some of the plurality of mailing lists;

receiving an email message including an identifier of one of the plurality of mailing lists;

determining that a sender of the email message has permission to send email messages to the identified mailing list using an access list;

accessing the identified mailing list to obtain at least one email address of at least one member of the mailing list; and sending the email message to the obtained at least one email address.

* * * * *

UNITED STATES PATENT AND TRADEMARK OFFICE
CERTIFICATE OF CORRECTION

| | | |
|---|---|---|
| PATENT NO. | : 7,734,696 B2 | Page 1 of 1 |
| APPLICATION NO. | : 10/117116 | |
| DATED | : June 8, 2010 | |
| INVENTOR(S) | : Donald H. Osterberg, Jr. et al. | |

It is certified that error appears in the above-identified patent and that said Letters Patent is hereby corrected as shown below:

In column 9, line 58, in claim 8, delete "org- chart" and insert -- org-chart --, therefor.

In column 10, line 6, in claim 8, delete "and an" and insert -- an --, therefor.

In column 11, line 11, in claim 16, delete "comprising" and insert -- comprising: --, therefor.

In column 11, line 66, in claim 20, delete "if" and insert -- of --, therefor.

In column 11, line 66, in claim 20, delete "each" and insert -- each alias --, therefor.

In column 14, line 20-21, in claim 26, delete "list; and" and insert -- list; --, therefor.

In column 14, line 24, in claim 26, delete "list;" and insert -- list; and --, therefor.

In column 14, line 25-26, in claim 26, delete "generating at least one access list defining permissions for at least some of the plurality of mailing lists;" and insert -- generating a plurality of aliases, each alias identifying one of the plurality of mailing lists; --, therefor.

In column 14, line 27, in claim 26, delete "an identifier of one" and insert -- an alias identifying one --, therefor.

In column 14, line 30-31, in claim 26, delete "list using an access list;" and insert -- list; --, therefor.

Signed and Sealed this
Nineteenth Day of July, 2011

David J. Kappos
*Director of the United States Patent and Trademark Office*